US006460484B2

(12) United States Patent
Ikegami et al.

(10) Patent No.: US 6,460,484 B2
(45) Date of Patent: Oct. 8, 2002

(54) PET SHEET

(75) Inventors: Takeshi Ikegami, Kagawa (JP); Kengo Ochi, Kagawa (JP)

(73) Assignee: Uni-Heartous Corporation, Tokyo (JP)

( * ) Notice: Subject to any disclaimer, the term of this patent is extended or adjusted under 35 U.S.C. 154(b) by 0 days.

(21) Appl. No.: 09/848,075

(22) Filed: May 3, 2001

(65) Prior Publication Data
US 2001/0042517 A1 Nov. 22, 2001

(30) Foreign Application Priority Data

May 10, 2000 (JP) ........................................ 2000-136701

(51) Int. Cl.[7] .............................................. A01K 1/015
(52) U.S. Cl. ................... 119/169; 119/161; 604/385.01
(58) Field of Search ................................. 119/161, 165, 119/169, 170; 604/358, 360, 378–380, 385.01, 385.101

(56) References Cited

U.S. PATENT DOCUMENTS

| 2,788,003 A | * | 4/1957 | Morin ......................... 604/366 |
| 3,559,650 A | * | 2/1971 | Larson ........................ 604/364 |
| 3,881,490 A | * | 5/1975 | Whitehead et al. .......... 604/366 |
| 3,934,588 A | * | 1/1976 | Mesek et al. ................ 604/365 |
| 3,938,522 A | * | 2/1976 | Repke ......................... 604/365 |
| 4,041,951 A | * | 8/1977 | Sanford ....................... 604/365 |
| 4,250,834 A | * | 2/1981 | Cheselka ..................... 119/169 |
| 4,961,930 A | * | 10/1990 | Perdelwitz et al. ......... 119/28.5 |
| 5,630,376 A | * | 5/1997 | Ochi et al. ................... 119/169 |
| 5,797,347 A | * | 8/1998 | Ochi ............................ 119/169 |
| 6,129,719 A | * | 10/2000 | Nozaki et al. .......... 604/385.01 |
| 6,140,551 A | * | 10/2000 | Niemeyer et al. ........... 604/358 |

FOREIGN PATENT DOCUMENTS

| DE | 2748348 | 5/1979 | .......... A01K/1/035 |
| EP | 0698341 A1 | 2/1996 | ............ A01K/1/01 |

* cited by examiner

Primary Examiner—Charles T. Jordan
Assistant Examiner—Kimberly S. Smith
(74) Attorney, Agent, or Firm—Baker & Daniels

(57) ABSTRACT

A pet sheet includes a hydrophilic top sheet arranged on the absorbing material, wherein a flap which is formed at least adjacent a peripheral edge of the absorbing material and opens toward the center of the absorbing material. Urine, which is not absorbed in the absorbing material and flows on the hydrophilic top sheet, enters between the hydrophilic top sheet and the flap, and can be stopped there.

15 Claims, 15 Drawing Sheets

PET SHEET

CROSS REFERENCE TO RELATED APPLICATION

This application claims the priority of Application No. 2000-136701, filed May 10, 2000 in Japan, the subject matter of which is incorporated herein by reference.

TECHNICAL FIELD OF THE INVENTION

The present invention relates to a pet sheet which is usually placed and used on a floor or the like for disposing of excreta of pets which are kept indoors.

BACKGROUND OF THE INVENTION

A conventional pet sheet includes, for example, a hydrophilic top sheet which absorbs liquid, an under sheet or back sheet having water repellency (water resistance), and an absorbing material arranged between those two sheets. Urine excreted from a pet passes through the hydrophilic top sheet and is absorbed in the absorbing material.

However, when the urine excreted from the pet is an amount exceeding the capacity of the absorbing material, the urine may leak out from the pet sheet. Also, the excreted urine may slide on the surface of the hydrophilic top sheet and may reach the edges of the sheet. Such urine may leak to the surrounding area.

OBJECTS OF THE INVENTION

Accordingly, an object of the present invention is to provide a pet sheet having a good performance in preventing the leakage of the excreta. Particularly, it is a major object to prevent the excreted urine from sliding sideways on the surface of the hydrophilic top sheet and leaking to the outside.

Additional objects, advantages and novel features of the present invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

According to a first aspect of the present invention, a pet sheet includes a hydrophilic top sheet arranged on the absorbing material, wherein a flap which is formed at least adjacent a peripheral edge of the absorbing material and opens toward the center of the absorbing material. Urine, which is not absorbed in the absorbing material and flows on the hydrophilic top sheet, enters between the hydrophilic top sheet and the flap, and can be stopped there.

In this instance, when no extra intermediate member is arranged between the hydrophilic top sheet and the flap, and the flap is maintained to be flush with (parallel to) the hydrophilic top sheet in an unused state, the pet is prevented from tripping over the flap.

Preferably, a plurality of the flaps is formed on the hydrophilic top sheet. Furthermore, the flaps may be formed on the entire surface of the absorbing material, thereby increasing the efficiency of stopping the urine. Thus, the urine which flows over the first flap can be stopped by the next flap.

In addition, preferably, at least one end of each of the flaps adjacent side edges of the sheet, which is opposite to a free or open end thereof, is fixed to the hydrophilic top sheet along two directions. In the case where, for example, the absorbing material and the hydrophilic top sheet are rectangular, the flap is provided along at least one side of the absorbing material and the hydrophilic top sheet is fixed in angular C shape. Thus, even when a large amount of urine flows between the hydrophilic top sheet and the flap, the flap is not pushed down on the side of adhering section.

Furthermore, indentations can be formed at least at positions corresponding to the flaps adjacent of the side edges of the absorbing material. For example, the indentation is a groove formed along the flap. Forming such an indentation enables the urine which is going to flow to the outside to be efficiently stopped even in the case where there is little space between the flap and the hydrophilic top sheet. That is, the urine which flows toward the outside after entering the indentation, pushes up the flap when it flows over the indentation. Accordingly, the flap is raised by the pressure from the urine, showing its fundamental function. Thus, the urine which flows toward the outside is prevented from passing over the flap. Particularly, when the flap is formed so as to cover a part of the groove, the aforesaid effect can be brought to the fore.

Also, when the indentations are formed on the absorbing material so that a plurality of small areas is formed, in whichever direction the urine in the area is going to flow, the urine is reliably trapped by the adjacent indentation. Thus, the movement of the urine can be controlled, regardless of the direction of the flow of the urine. Furthermore, when the indentations are formed so that the small areas are formed on the entire surface of the absorbing material, the movement of the urine which slides and flows over the hydrophilic top sheet can be controlled, regardless of the position and the direction in which the urine is excreted.

According to another aspect of the present invention, a pet sheet includes grooves which guide the flow of the liquid in a specified direction are formed on the absorbing material. For example, in the case of a rectangular sheet, by forming grooves which extend in the longitudinal direction at the rims of the long sides thereof, the urine which is going to flow out almost perpendicularly to the grooves can be guided in the longitudinal direction. Consequently, the urine can be spread out over the entire absorbing material, and is thus unlikely to leak to the outside.

BRIEF DESCRIPTION OF THE DRAWINGS

FIG. 2A and FIG. 2B are partially sectional views taken on line A–A' of FIG. 1, wherein FIG. 2A shows a non-used state and FIG. 2B shows a used state;

FIG. 4A and FIG. 4B are partially sectional views taken on line A–A' of FIG. 3, wherein FIG. 4A shows a non-used state and FIG. 4B shows a used state;

FIG. 8A and FIG. 8B are partially sectional views taken on line A–A' of FIG. 7, wherein FIG. 8A shows a non-used state and FIG. 8B shows a used state;

DETAILED DISCLOSURE OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and scope of the present inventions is defined only by the appended claims.

An embodiment of the present invention will be described hereinbelow using a rectangular pet sheet as an example. The invention is not limited to the shape, the size, and the like of the following described pet sheets, and modifications may be made in the invention according to the kind of the pet and the condition of use.

Figure 1:
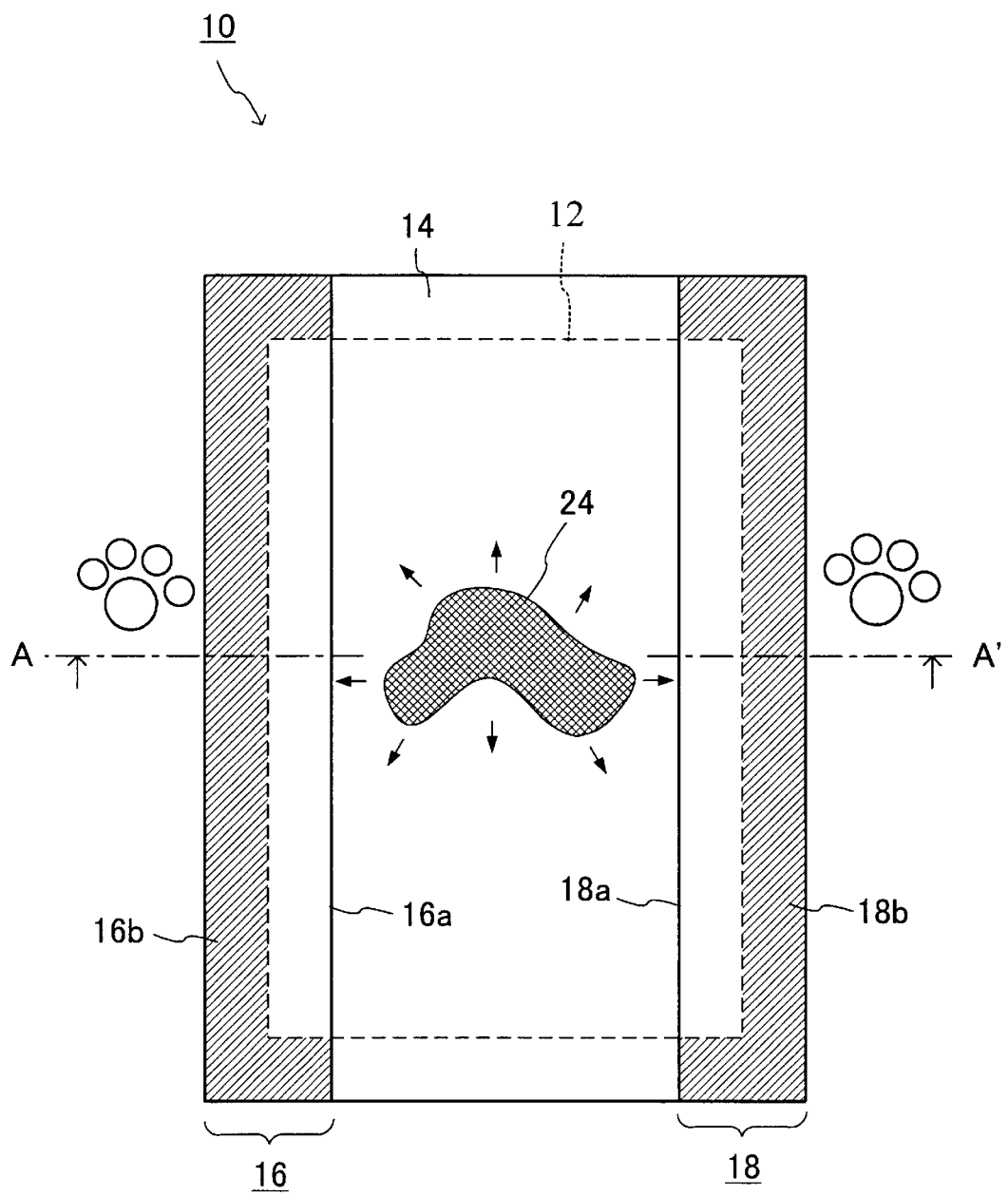
FIG. 1 is a plan view showing a structure of a pet sheet according to a first embodiment of the present invention.
Figure 2A:
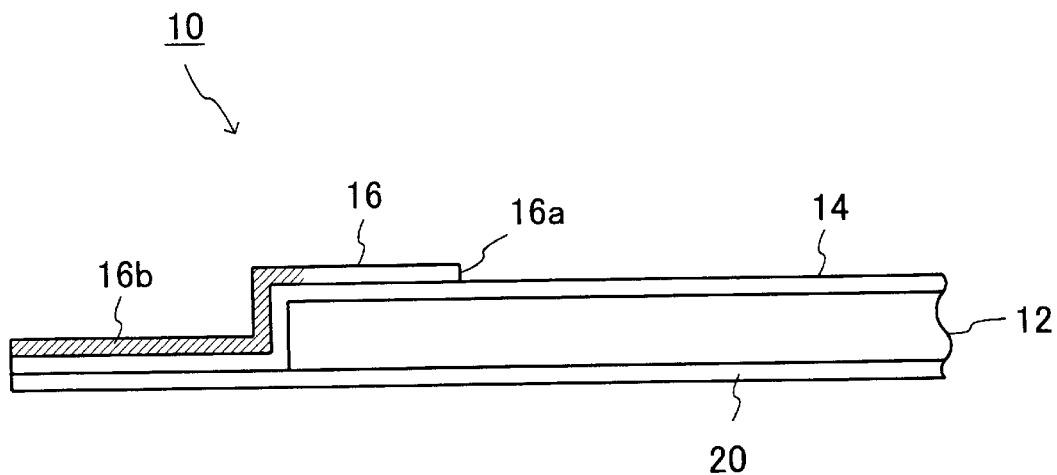
Figure 2B:
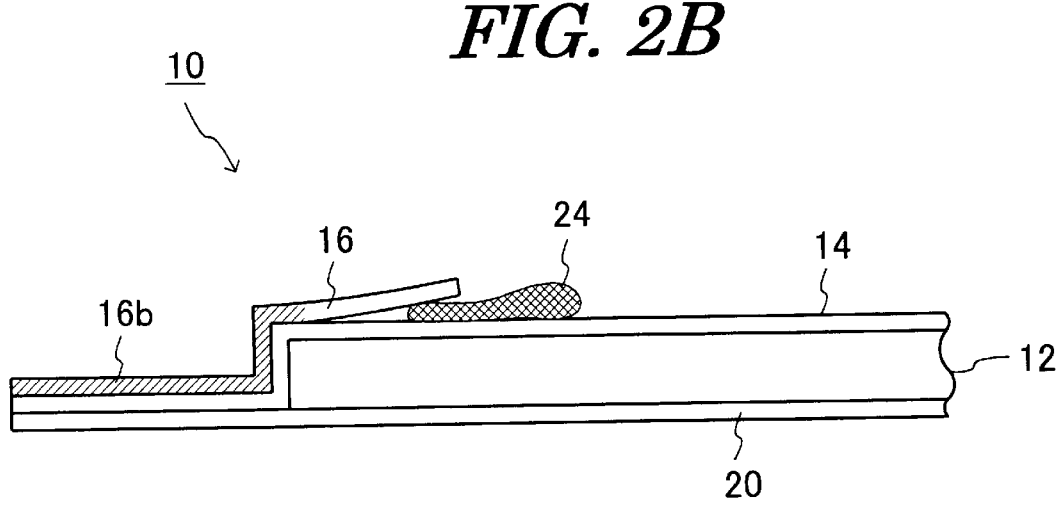

FIG. 1, FIG. 2A, and FIG. 2B are a plan view and cross sectional views, respectively, showing a pet sheet 10 according to a first embodiment of the present invention. The pet sheet 10 includes: an absorbing material 12 having a good absorbing property for liquid such as urine; a hydrophilic top sheet 14 arranged so as to cover the absorbing material 12; an under sheet or back sheet 20 having water repellency or water resistance, which is arranged so as to sandwich the absorbing material 12 between the under sheet 20 and the hydrophilic top sheet 14; and a pair of flaps 16 and 18 arranged at the rims on the long sides of the hydrophilic top sheet 14.

A material in which a super-absorbing polymer (SAP) is mixed with pulp or cotton and is then wrapped in a tissue or a non-woven fabric can be used as the absorbing material 12. The absorbing material 12 is arranged around the center of the hydrophilic top sheet 14 and the under sheet 20 and absorbs urine 24 or the like which is excreted from the pet.

The hydrophilic top sheet 14 can be formed of a nonwoven fabric formed by a synthetic fiber such as a point bonded non-woven fabric formed from polypropylene (PP), a non-woven fabric including an absorbing fiber such as a rayon fiber, or a non-woven fabric formed only from the absorbing fiber. Furthermore, a micropore film having a number of micropores can also be used. A polyethylene (PE) film, a plastic sheet, or the like can be used as the under sheet 20.

The flaps 16 and 18 are arranged at peripheral ends or edges of on longer sides of the absorbing material 12. The flaps 16 and 18 are formed to have free ends or opening sections 16a and 18a, respectively, which are directed toward the center of the absorbing material 12. Since the flaps 16 and 18 are provided at peripheral ends or edges of the hydrophilic top sheet 14, the urine 24 which is not absorbed in the absorbing material 12 and which flows sideways on the hydrophilic top sheet 14 can enter between the flaps 16 and 18, thus stopping the flow of the urine 24 there. The flaps 16 and 18 are designed to have a rigidity such that they easily rise when the urine 24 enters therein. For example, the rigidity is set according to a measurement of 50 mm or less obtained by a cantilever method.

The flaps 16 and 18 are made of a water repellent material on the side (lower side) facing the hydrophilic top sheet 14. For example, the following can be used: a film; a water repellent non-woven fabric; a hydrophilic non-woven fabric which is subjected to water repellent finishing; a water repellent film or non-woven fabric which is affixed to a hydrophilic non-woven fabric or a tissue; and a single non-woven fabric having both a water repellent side and a hydrophilic side. As long as the inner side is water repellent, the outer side may be hydrophilic or water repellent to obtain an effect of stopping the urine.

No extra intermediate material is arranged between the hydrophilic top sheet 14 and the flaps 16 and 18, and the flaps 16 and 18 are maintained to be flat to the hydrophilic top sheet 14 in an unused state. Therefore, the pet does not trip over the flaps 16 and 18.

The flaps 16 and 18 are fixed to the hydrophilic top sheet 14 at adhering sections 16b and 18b. The flaps 16 and 18 can be fixed to the hydrophilic top sheet 14 (pet sheet main body) using a hot melt adhesive, heat-sealing, or the like. In the drawings, the adhering sections 16b and 18b are shown by diagonally shaded areas.

The adhering sections 16b and 18b substantially form an angular C shape in plan view such that even if a large amount of urine 24 flows between the hydrophilic top sheet 14 and the flaps 16 and 18, the flaps 16 and 18 are not bent over towards the sides of the adhering sections 16b and 18b due to the flow of the urine 24. In addition, the shape of the adhering sections 16b and 18b of the flaps 16 and 18 is not limited to the angular C shape, and if they are fixed in two dimensions, an effect similar to the case of angular C shape can be obtained. Also, in the present embodiment, although the adhering sections 16b and 18b of the flaps 16 and 18 almost coincide with the ends of the absorbing material 12, the attachment position of the flaps 16 and 18 may overlap with an upper rim of the absorbing material 12. However, it is preferable that the adhering sections 16b and 18b of the flaps 16 and 18 be as near the rim (end) of the absorbing material 12 as possible for the purpose of stopping the flow of the urine 24.

Also, according to the embodiment, although the flaps 16 and 18 are made of a different material from the pet sheet main body (12, 14, and 20), the flaps 16 and 18 may be formed by rolling up the under sheet 20 toward the top sheet 14. In other words, the ends of the under sheet 20 may form the flaps 16 and 18.

When the above described pet sheet is placed and used on a floor or the like, a pet such as a dog straddles the pet sheet 10 and excretes the urine 24 or the like. The excreted urine 24 is absorbed in the absorbing material 12 through the hydrophilic top sheet 14. In this instance, the urine 24, which flows quickly in a lateral direction (a direction almost perpendicular to the long side), slides on the hydrophilic top sheet 14 and is going to flow out of the pet sheet 10. This urine 24 enters between the flap 16 (18) and the hydrophilic top sheet 14 and is stopped, as shown in FIG. 2B.

Figure 3:
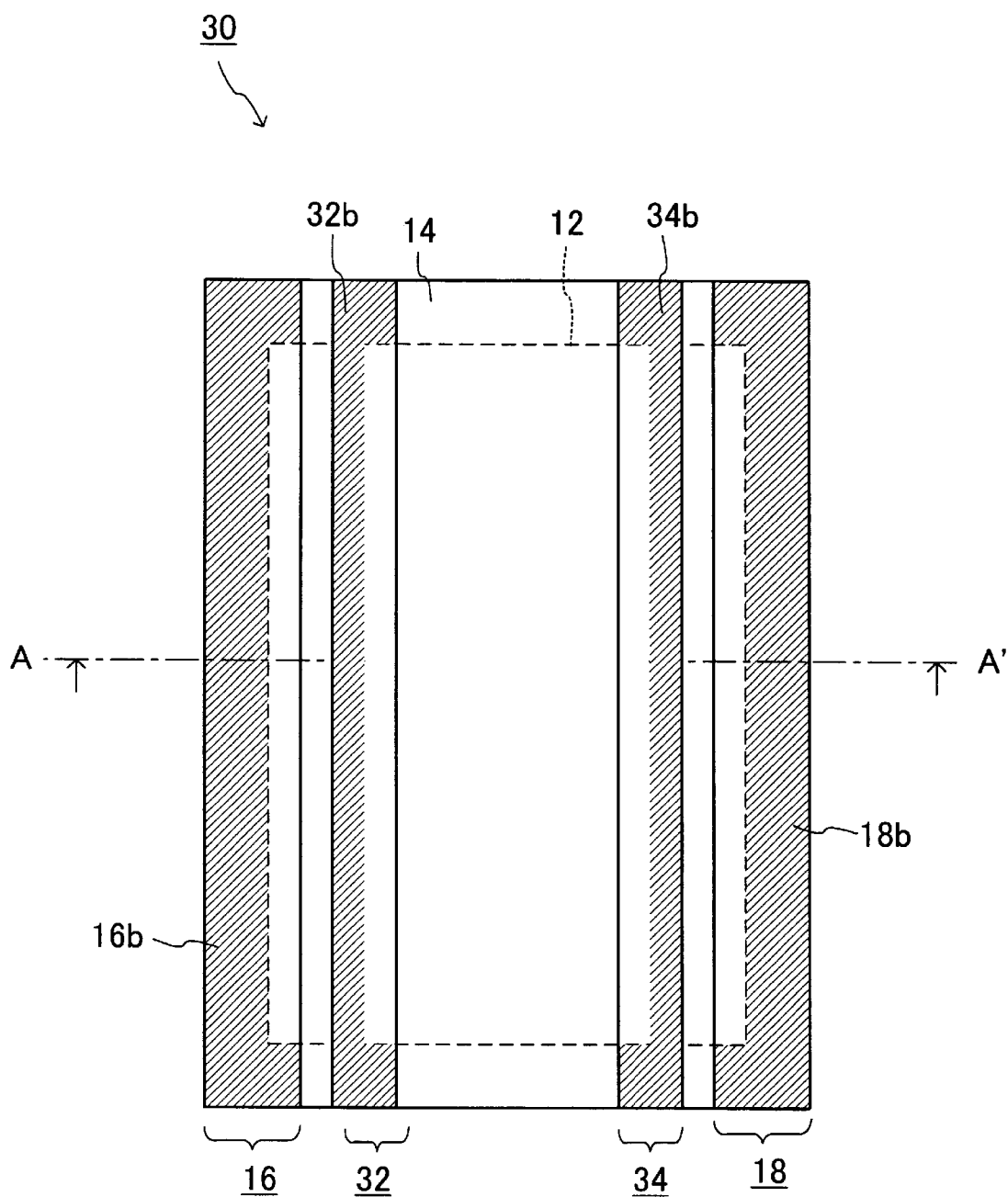
FIG. 3 is a plan view showing a structure of a pet sheet according to a second embodiment of the present invention.
Figure 4A:
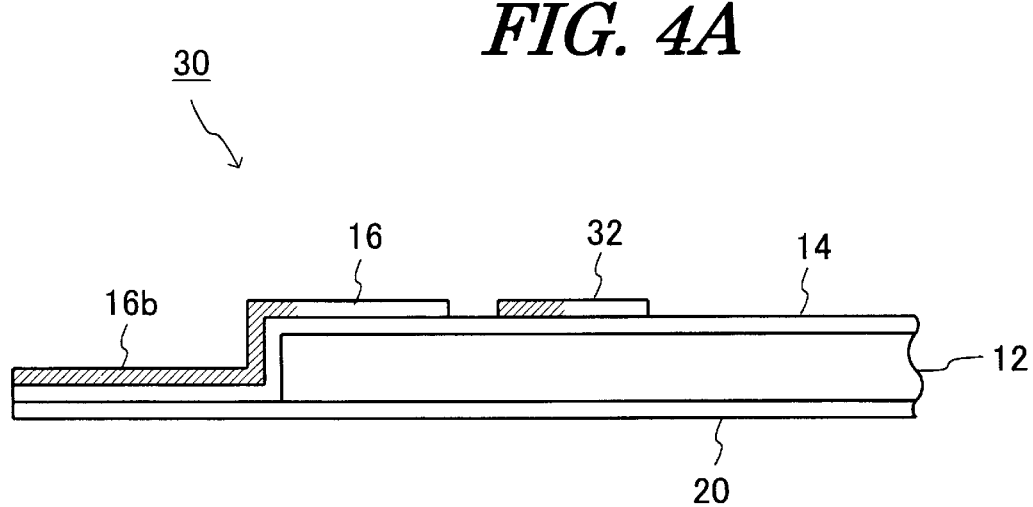
Figure 4B:
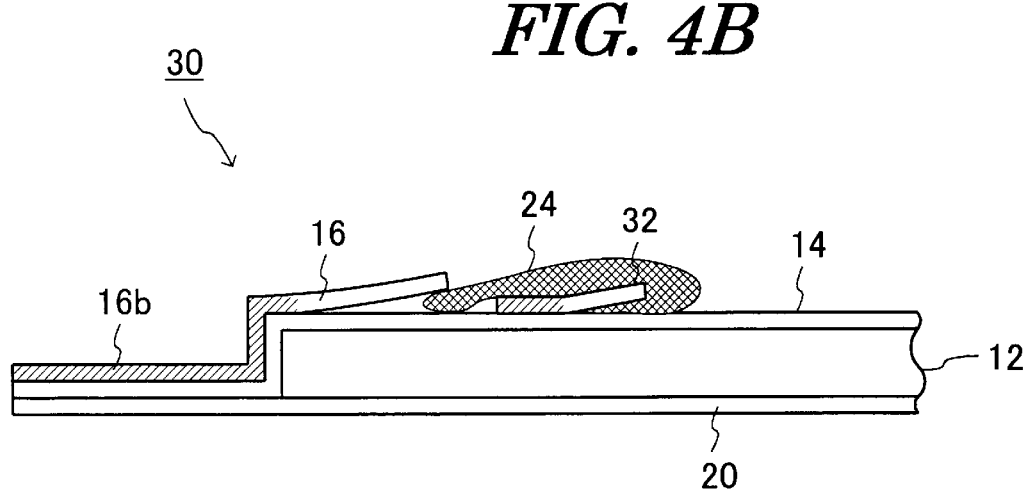

FIG. 3 and FIG. 4 are a plan view and a cross sectional view, respectively, showing a pet sheet 30 according to a second embodiment of the present invention. In the pet sheet 30 according to this embodiment, two flaps 32 and 34 are additionally provided for the pet sheet 10 according to the first embodiment. Composing elements identical to or corresponding to those in the first embodiment are given the same reference numerals and a description of previously described elements is omitted.

The pet sheet 30 includes: an absorbing material 12 having a good water-absorption property for liquid such as urine; a hydrophilic top sheet 14 arranged so as to cover the absorbing material 12; an under sheet (back sheet) 20 having water repellency or water resistance, which is arranged so as to sandwich the absorbing material 12 between the under sheet 20 and the hydrophilic top sheet 14; a pair of flaps 16 and 18 arranged at peripheral edges or ends of the hydrophilic top sheet 14; and the flaps 32 and 34 provided on the inner side of the flaps 16 and 18.

The flaps 16 and 18 are arranged around the peripheral edges of longer sides of the absorbing material 12 to have opening sections (free ends) directed toward the center of the absorbing material 12. The flaps 32 and 34 are arranged in parallel with a predetermined distance from the flaps 16 and 18, and are adhered and fixed to the hydrophilic top sheet 14 by adhering sections 32b and 34b in the same manner as the flaps 16 and 18. In the drawings, the adhering sections 32b and 34b are shown by diagonally shaded areas. The flaps 32 and 34 may principally have the same structure (including the material) as the flaps 16 and 18.

According to this embodiment, since the flaps 32 and 34 are additionally provided on the inner side of the flaps 16 and 18, which are located around the peripheral edges or ends of the absorbing material 12, the ability to stop the urine 24 is improved. Thus, the urine 24 which flows over the first flaps 32 and 34 may be efficiently stopped by the next flaps 16 and 18.

Figure 5:
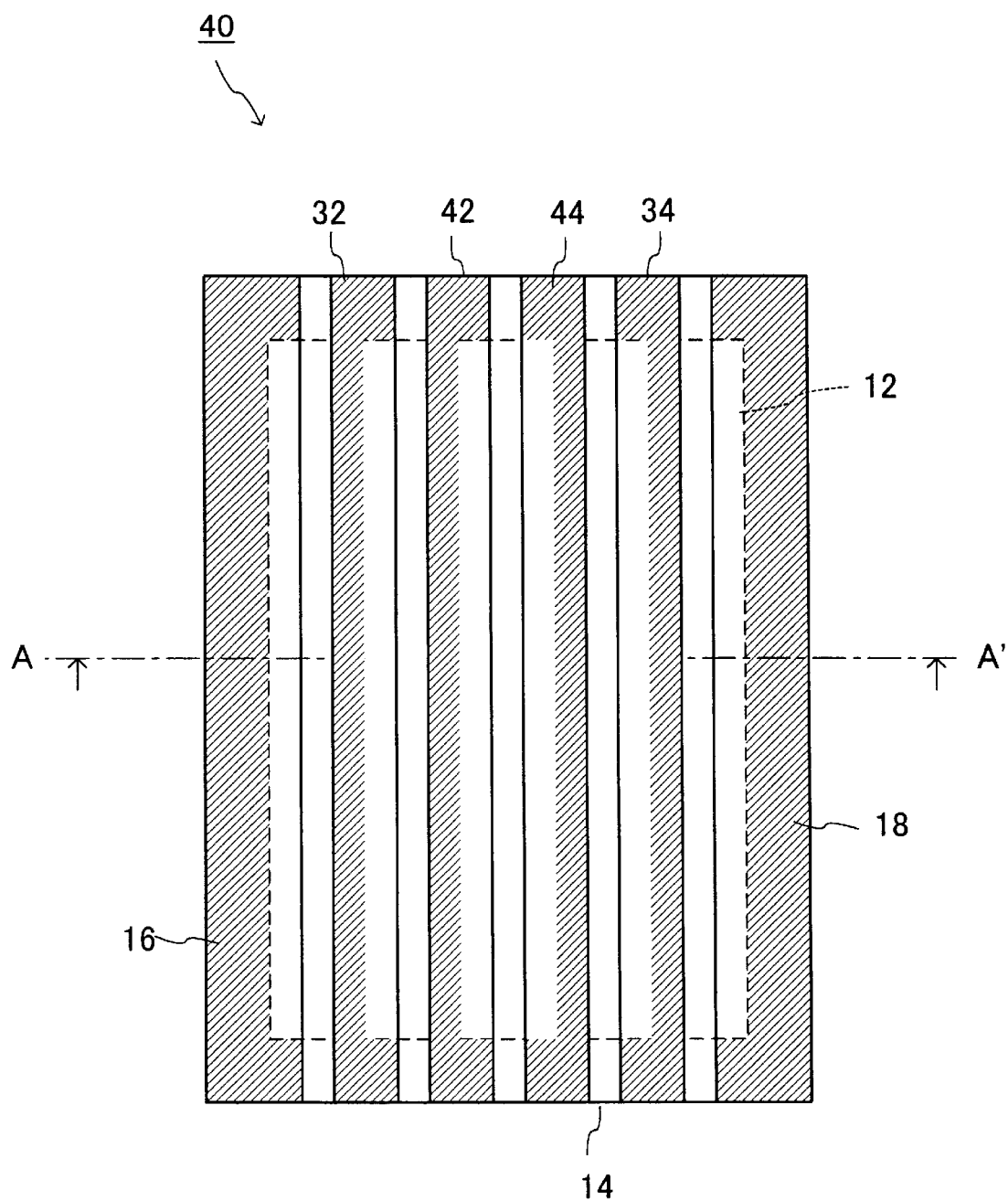
FIG. 5 is a plan view showing a structure of a pet sheet according to a third embodiment of the present invention.
Figure 6:
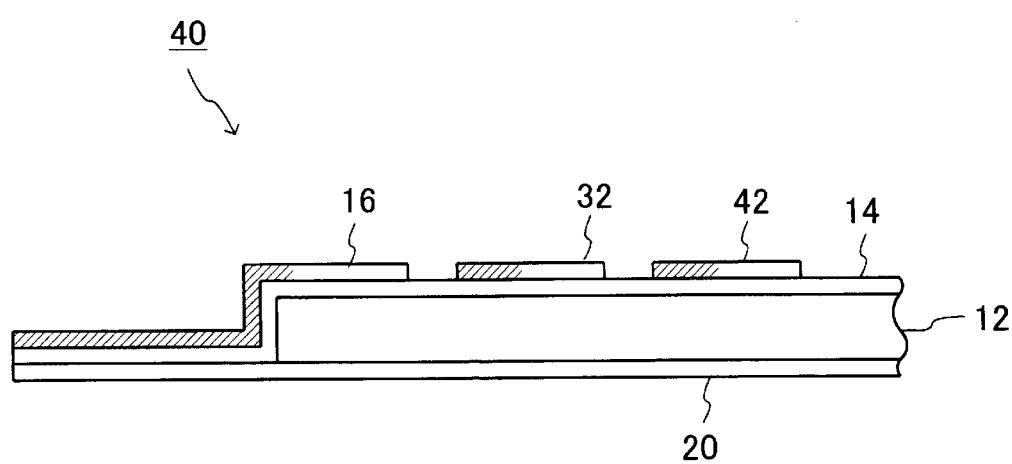
FIG. 6 is a partially sectional view taken on line A–A' of FIG. 5.

FIG. 5 and FIG. 6 are a plan view and a cross sectional view, respectively, showing a pet sheet 40 according to a third embodiment of the present invention. In the pet sheet 40 according to this embodiment, two flaps 42 and 44 are additionally provided on the inner side of the flaps 32 and 34 of the pet sheet 30 according to the second embodiment. In addition, composing elements identical to or corresponding to those in the above embodiments are given the same reference numerals and a description of previously described elements is omitted. In this embodiment, while six flaps are used in total, a fundamental concept is not related to the number of flaps, but to provide the flaps on the entire surface of the absorbing material 12.

The pet sheet 40 includes: an absorbing material 12 having a good water-absorption property for liquid such as urine; a hydrophilic top sheet 14 arranged so as to cover the absorbing material 12; an under sheet (back sheet) 20 having water repellency or water resistance, which is arranged so as to sandwich the absorbing material 12 between the under sheet 20 and the hydrophilic top sheet 14; a pair of flaps 16 and 18 arranged around peripheral edges or ends of the hydrophilic top sheet 14; the flaps 32 and 34 provided on the inner side of the flaps 16 and 18; and the flaps 42 and 44 additionally provided on the inner side of the flaps 32 and 34.

The flaps 16 and 18 are arranged at the peripheral edges or ends of longer sides of the absorbing material 12 to have opening sections (free ends) directed toward the center of the absorbing material 12. The flaps 32 and 34 are arranged in parallel with a predetermined distance from the flaps 16 and 18, and are adhered and fixed to the hydrophilic top sheet 14 at the adhering sections 32b and 34b in the same manner as the flaps 16 and 18. The flaps 42 and 44 are arranged in parallel with a predetermined distance from the flaps 32 and 34, and are adhered and fixed to the hydrophilic top sheet 14 in the same manner as the flaps 32 and 34. In the drawings, the adhering sections are shown by diagonally shaded areas.

In this embodiment, since the flaps are provided on the entire surface of the absorbing material 12, the ability to stop the urine 24 is further improved, compared with the pet sheet 30 according to the second embodiment.

Figure 7:
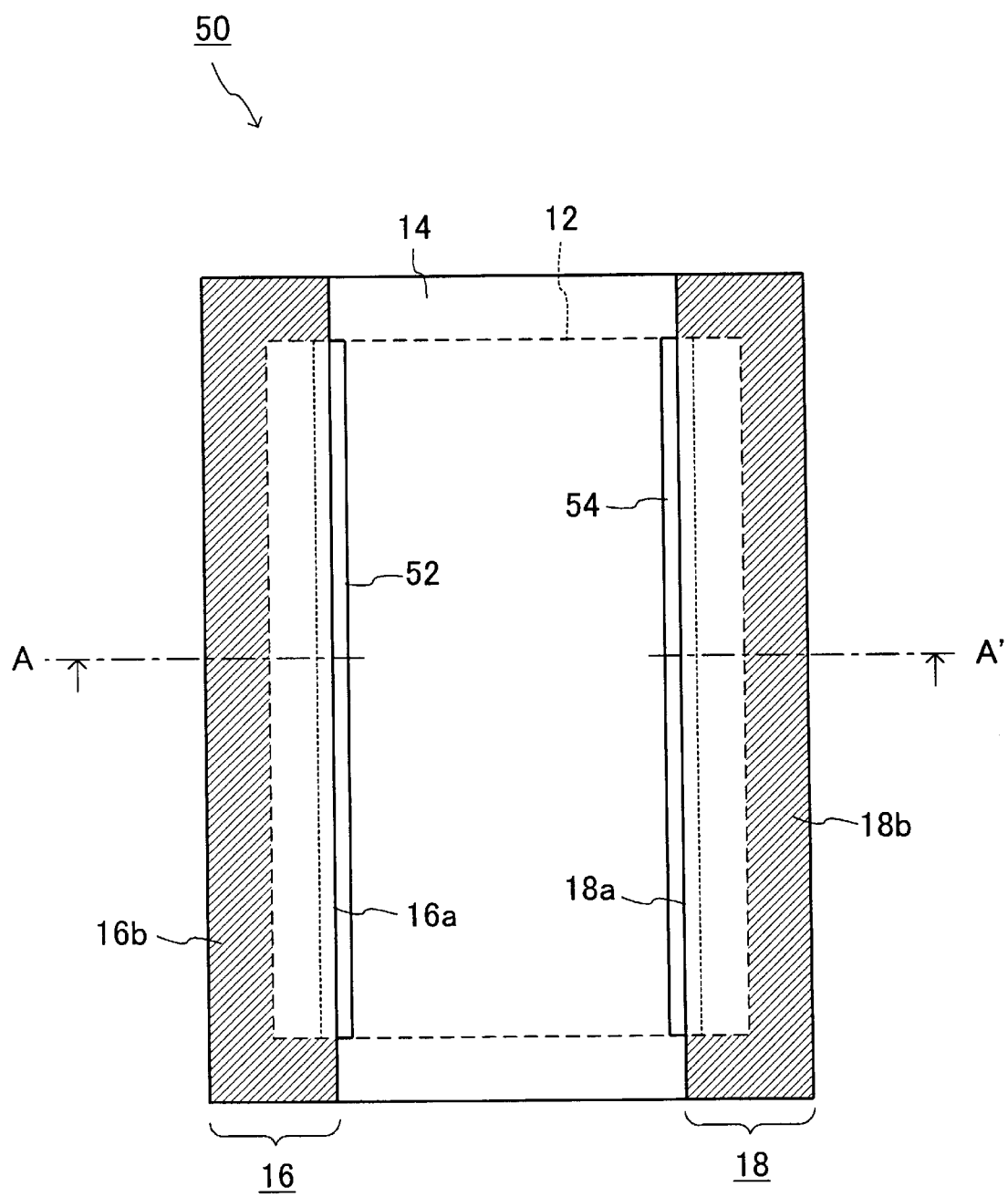
FIG. 7 is a plan view showing a structure of a pet sheet according to a fourth embodiment of the present invention.
Figure 8A:
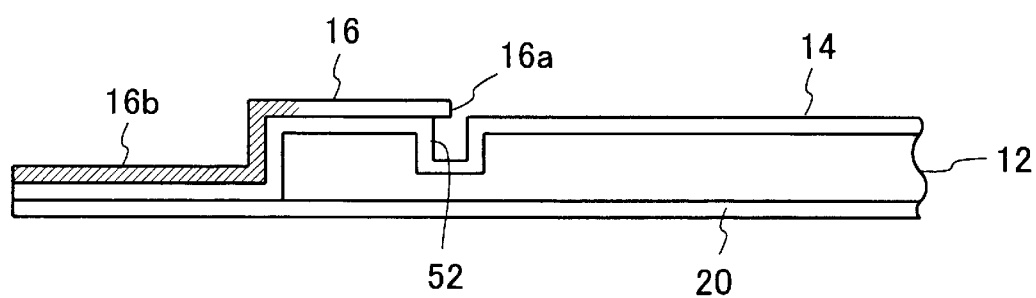

FIG. 7 and FIG. 8 are a plan view and a cross sectional view, respectively, showing a pet sheet 50 according to a fourth embodiment of the present invention. The pet sheet 50 according to this embodiment is constructed so as to provide grooves 52 and 54 for the pet sheet 10 according to the first embodiment. Since the other structures, materials, and the like are principally the same as those of the first embodiment, a description of previously described elements is omitted. In addition, composing elements identical to or corresponding to those in the foregoing embodiments are given the same reference numerals.

The pet sheet 50 includes: the absorbing material 12 having a good absorbing property for liquid such as urine; a hydrophilic top sheet 14 arranged so as to cover the absorbing material 12; an under sheet (back sheet) 20 having water repellency or water resistance, which is arranged so as to sandwich the absorbing material 12 between the under sheet 20 and the hydrophilic top sheet 14; and a pair of flaps 16 and 18 arranged at peripheral edges or ends of the hydrophilic top sheet 14. Also, grooves 52 and 54 are formed at positions corresponding to the flaps 16 and 18 on the absorbing material 12 and the hydrophilic top sheet 14.

Preferably, the grooves 52 and 54 are positioned, for example, within 150 mm from the peripheral ends of the absorbing material 12. In addition, the grooves 52 and 54 can be formed by a method in which the absorbing material 12 is pressed with a roller in a well known embossing process, or by a method in which the thickness of only the parts of pulp constructing the absorbing material 12, which correspond to the grooves 52 and 54, is decreased. Preferably, each of the grooves 52 and 54 is provided continuously without any disconnection. Assuming that the grooves 52 and 54 are intermittently formed, for example, the length of each of the grooves 52 and 54 is set to 30 percent or more of the length of each of the flaps 16 and 18. The width of each of the grooves 52 and 54 is, for example, set to 3 mm or more in order to securely trap the urine 24.

Figure 8B:
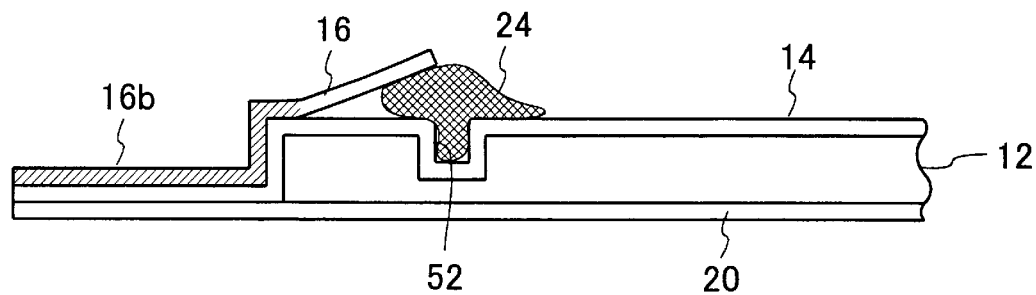

Also, in this embodiment, the grooves 52 and 54 are arranged so that a half of the width thereof is overlapped by the flaps 16 and 18. Accordingly, the urine 24 which slides and flows on the hydrophilic top sheet 14 is prevented from flowing over the flaps 16 and 18 to the outside. In other words, the urine 24 which flows on the hydrophilic top sheet 14 enters the grooves 52 and 54 before reaching the flaps 16 and 18, and pushes up the flaps 16 and 18 from below, as shown in FIG. 8B. As a result, the flaps 16 and 18 are efficiently raised to stop the urine 24.

In this embodiment, as described above, since the two grooves 52 and 54 are provided on the absorbing material 12, the direction of the flow of the urine 24 which slides sideways can be controlled or limited. In other words, the urine 24 which flows laterally (in the direction perpendicular to the long side) is guided in the vertical direction (longitudinal direction) to some extent, and is spread out over a wide area of the absorbing material 12. Also, in the case where there is little space between the flaps 16 and 18 and the hydrophilic top sheet 14, the urine 24 which is going to flow to the outside can be efficiently stopped. That is, the urine 24 which flows toward the outside once entering the grooves 52 and 54, pushes up the flaps 16 and 18 when it flows over the grooves 52 and 54, and accordingly, the flaps 16 and 18 are raised, performing their fundamental function. Thus, the urine 24 which flows toward the outside is prevented from flowing over the flaps 16 and 18 without stopping.

Figure 9:
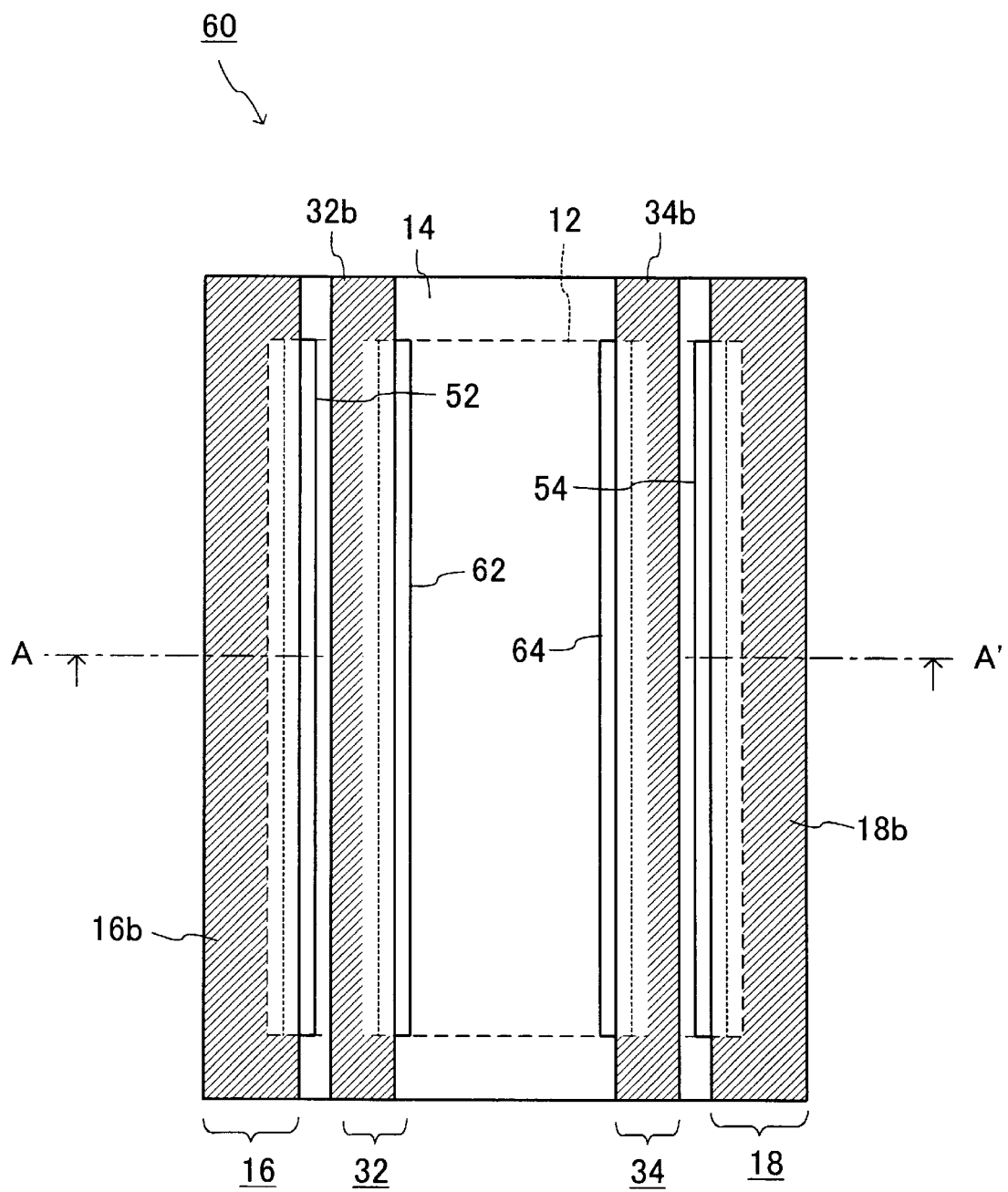
FIG. 9 is a plan view showing a structure of a pet sheet according to a fifth embodiment of the present invention.
Figure 10:
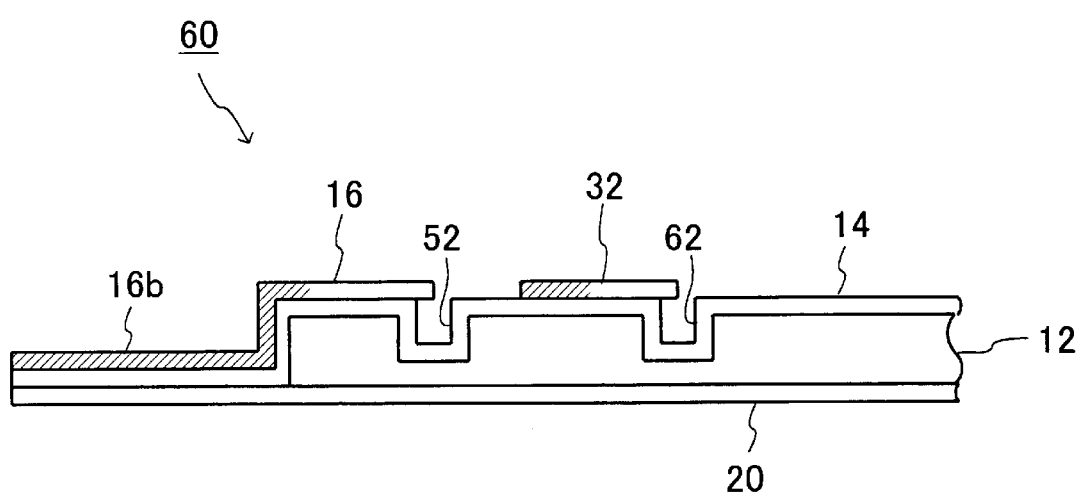
FIG. 10 is a partially sectional view taken on line A–A' of FIG. 9.

FIG. 9 and FIG. 10 are a plan view and a cross sectional view, respectively, showing a pet sheet 60 according to a fifth embodiment of the present invention. The pet sheet 60 according to this embodiment has both the features of the pet sheet 30 according to the second embodiment and the features of the pet sheet 50 according to the fourth embodiment. In addition, composing elements identical to or corresponding to those in the above-described embodiments are given the same reference numerals, and a description of previously described elements is omitted.

The pet sheet 60 includes: an absorbing material 12 having a good water-absorption property for liquid such as urine; a hydrophilic top sheet 14 arranged so as to cover the absorbing material 12; an under sheet 20 having water repellency or water resistance, which is arranged so as to sandwich the absorbing material 12 between the under sheet 20 and the hydrophilic top sheet 14; a pair of flaps 16 and 18 arranged at peripheral edges or rims of the hydrophilic top sheet 14; and flaps 32 and 34 provided on the inner side of the flaps 16 and 18. Also, grooves 52 and 54 are formed at positions corresponding to the flaps 16 and 18 on the absorbing material 12 and the hydrophilic top sheet 14, and grooves 62 and 64 are formed at positions corresponding to the flaps 32 and 34.

The grooves 62 and 64 can also be formed by a method in which the absorbing material 12 is pressed with a roller, or by a method in which the thickness of the pulp forming the absorbing material 12 is decreased, or the like. Preferably, each of the grooves 62 and 64 are provided continuously without disconnection. When the grooves 62 and 64 are formed intermittently, the length of each of the grooves 62 and 64 is set to 30 percent or more of the length of each of the flaps 32 and 34. The width of each of the grooves 62 and 64 is, for example, set to 3 mm or more in a manner similar to the grooves 52 and 54. In addition, the grooves 62 and 64 are arranged so that a half of the width of each of the grooves 62 and 64 is covered with the flaps 32 and 34.

Figure 11:
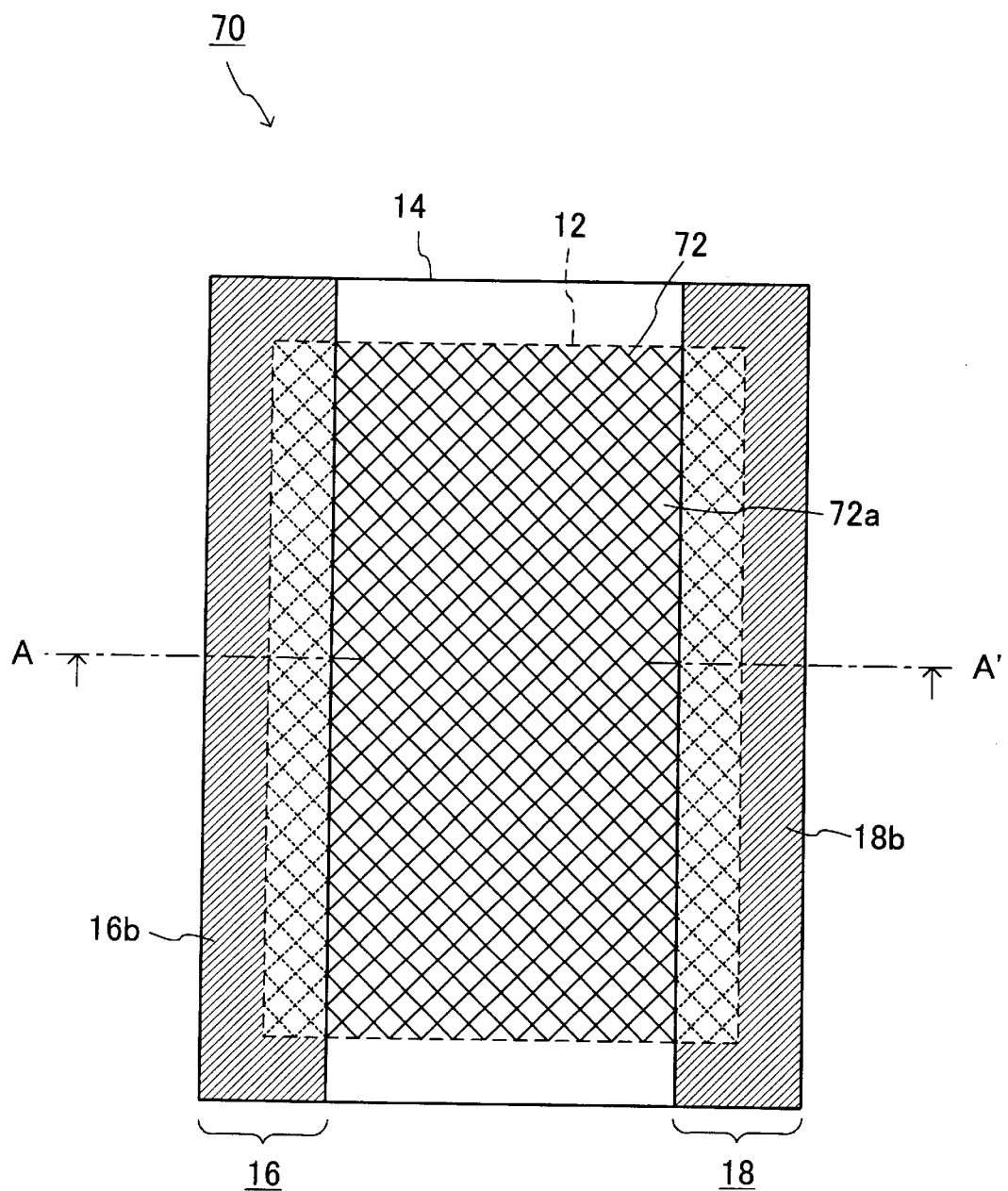
FIG. 11 is a plan view showing a structure of a pet sheet according to a sixth embodiment of the present invention.
Figure 12:
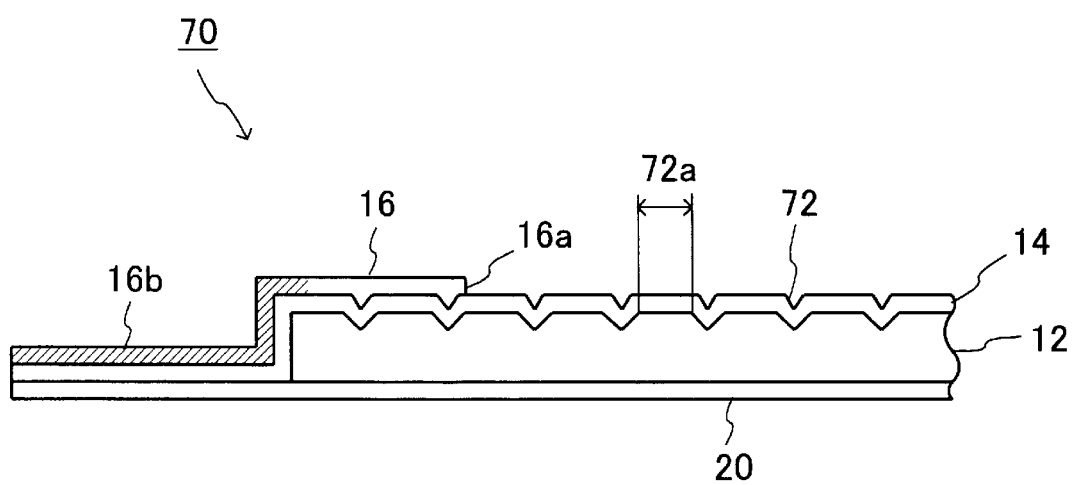
FIG. 12 is a partially sectional view taken on line A–A' of FIG. 11.

FIGS. 11 and 12 are a plan view and a cross sectional view, respectively, showing a pet sheet 70 according to a sixth embodiment of the present invention. The pet sheet 70 according to this embodiment is constructed so that the entire surface of the absorbing material 12 is subjected to an embossing process, based on the pet sheet 10 according to the first embodiment. In addition, composing elements identical to or corresponding to those in the above-described embodiments are indicated by the same reference numerals, and a description of previously described elements is omitted.

The pet sheet 70 includes: an absorbing material 12 having a good water-absorption property for liquid such as urine; a hydrophilic top sheet 14 arranged so as to cover the absorbing material 12; an under sheet 20 having water repellency or water resistance, which is arranged so as to sandwich the absorbing material 12 between the under sheet 20 and the hydrophilic top sheet 14; and a pair of flaps 16 and 18 arranged at the rims of the hydrophilic top sheet 14. Also, indentations 72 are formed on the entire surface of the absorbing material 12 so that a plurality of small areas 72a is formed on the absorbing materials 12. The indentations 72 can be formed by an embossing process in which the absorbing material 12 is pressed by rolling. Also, the indentations 72 can be formed not on the entire surface of the absorbing material 12, but on a part of the absorbing material 12. In this embodiment, although the plurality of small areas 72a which are provided by partitioning the absorbing material 12 into the indentations 72 are rectangular, it is not limited to this, and the areas may be triangular, polygonal, circular, elliptical, or the like.

In this embodiment, since the indentations 72 are formed on the absorbing material 12 so that the plurality of small areas 72a are formed, in whichever direction the urine in the small area 72a is going to flow, the urine is efficiently trapped by the nearby indentation 72. Thus, the movement of the urine can be controlled regardless of the direction of the flow of the urine. Furthermore, since the small areas 72a are formed on the entire surface of the absorbing material 12, the movement of the urine which slides and flows over the hydrophilic top sheet 14 can be controlled regardless of the position and the direction in which the urine is excreted.

Figure 13:
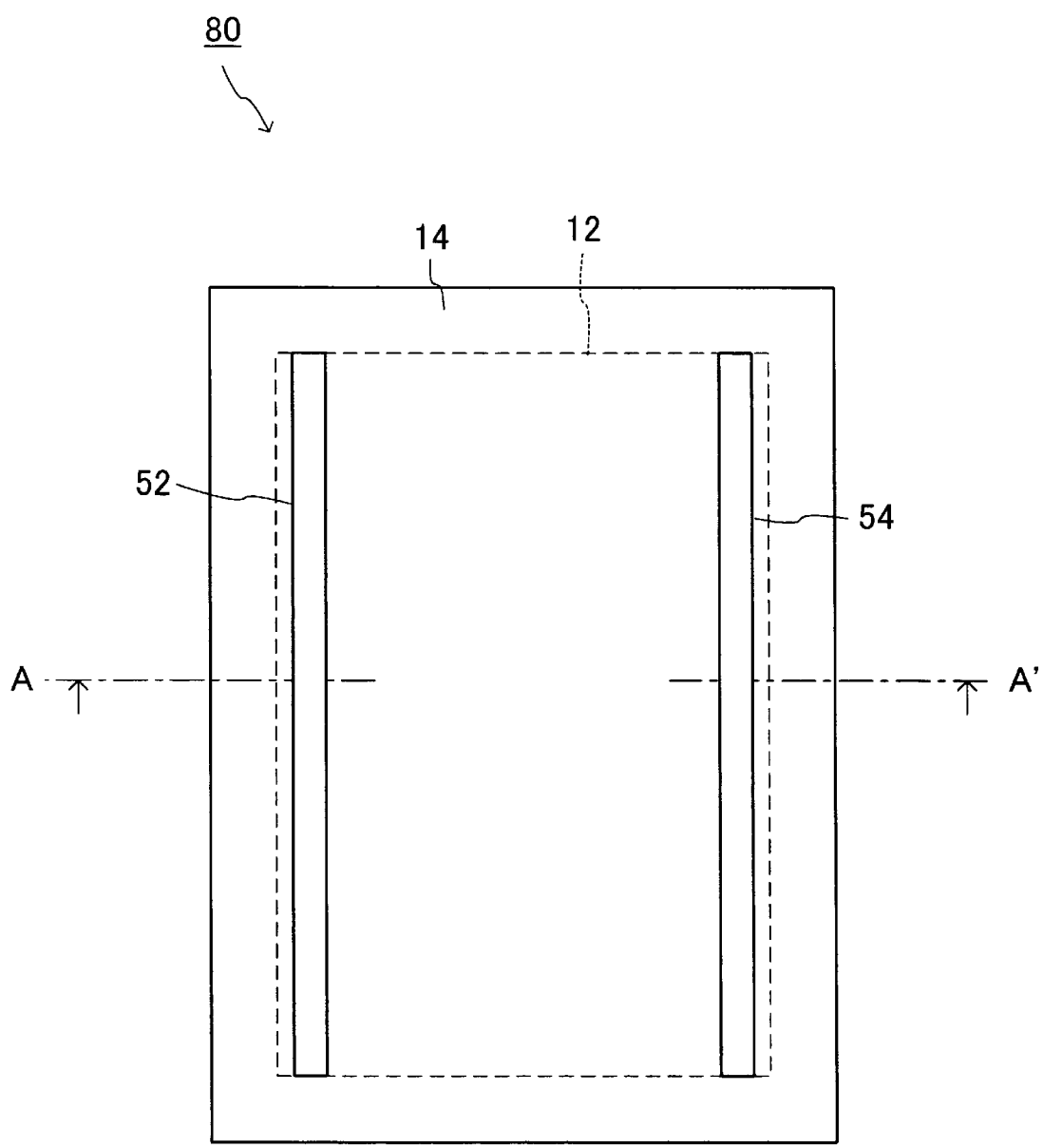
FIG. 13 is a plan view showing a structure of a pet sheet according to a seventh embodiment of the present invention.
Figure 14:
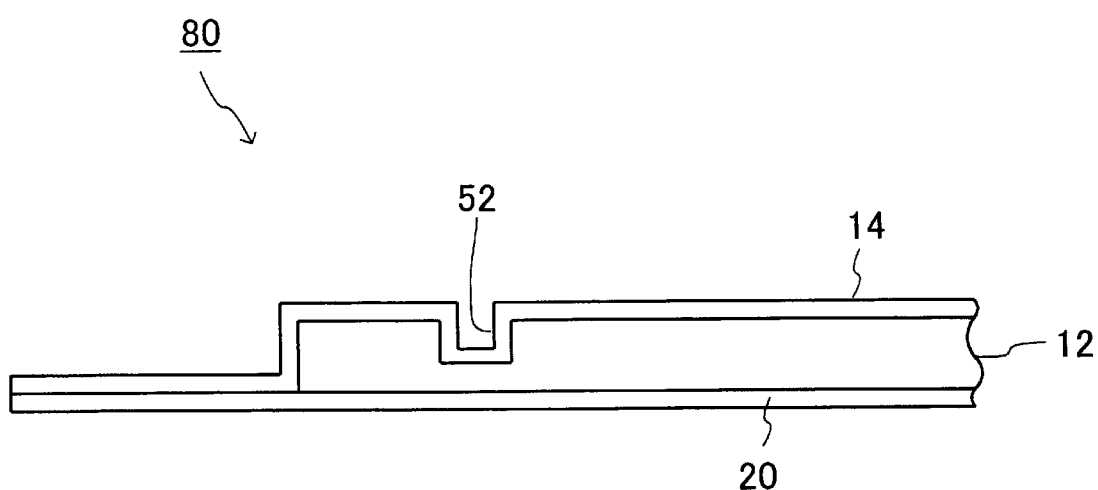
FIG. 14 is a partially sectional view taken on line A–A' of FIG. 13.

FIG. 13 and FIG. 14 are a plan view and a cross sectional view, respectively, showing a pet sheet 80 according to a seventh embodiment of the present invention. In the pet sheet 80 according to this embodiment, the flaps adopted in the above-described embodiments are not used, and only two grooves 52 and 54 are formed in the absorbing material 12. In addition, composing elements identical to or corresponding to those in the above-described embodiments are given the same reference numerals, and a description of previously described elements is omitted.

The pet sheet 80 includes: an absorbing material 12 having a good water-absorption property for liquid such as urine; a hydrophilic top sheet 14 arranged so as to cover the absorbing material 12; and an under sheet 20 having water repellency or water resistance, which is arranged so as to sandwich the absorbing material 12 between the under sheet 20 and the hydrophilic top sheet 14. In addition, the grooves 52 and 54 which guide the flow of the liquid (urine 24) in the longitudinal direction are formed at peripheral ends or rims of the longer sides of the absorbing material 12.

In this embodiment, as described above, since the two grooves 52 and 54 are provided on the absorbing material 12, the direction of the flow of the urine 24 which slides sideways can be controlled. In other words, the urine 24 which flows laterally (in the direction perpendicular to the long side) is guided in the vertical direction (longitudinal direction) to some extent, and is spread out over a wide area of the absorbing material 12.

Figure 15:
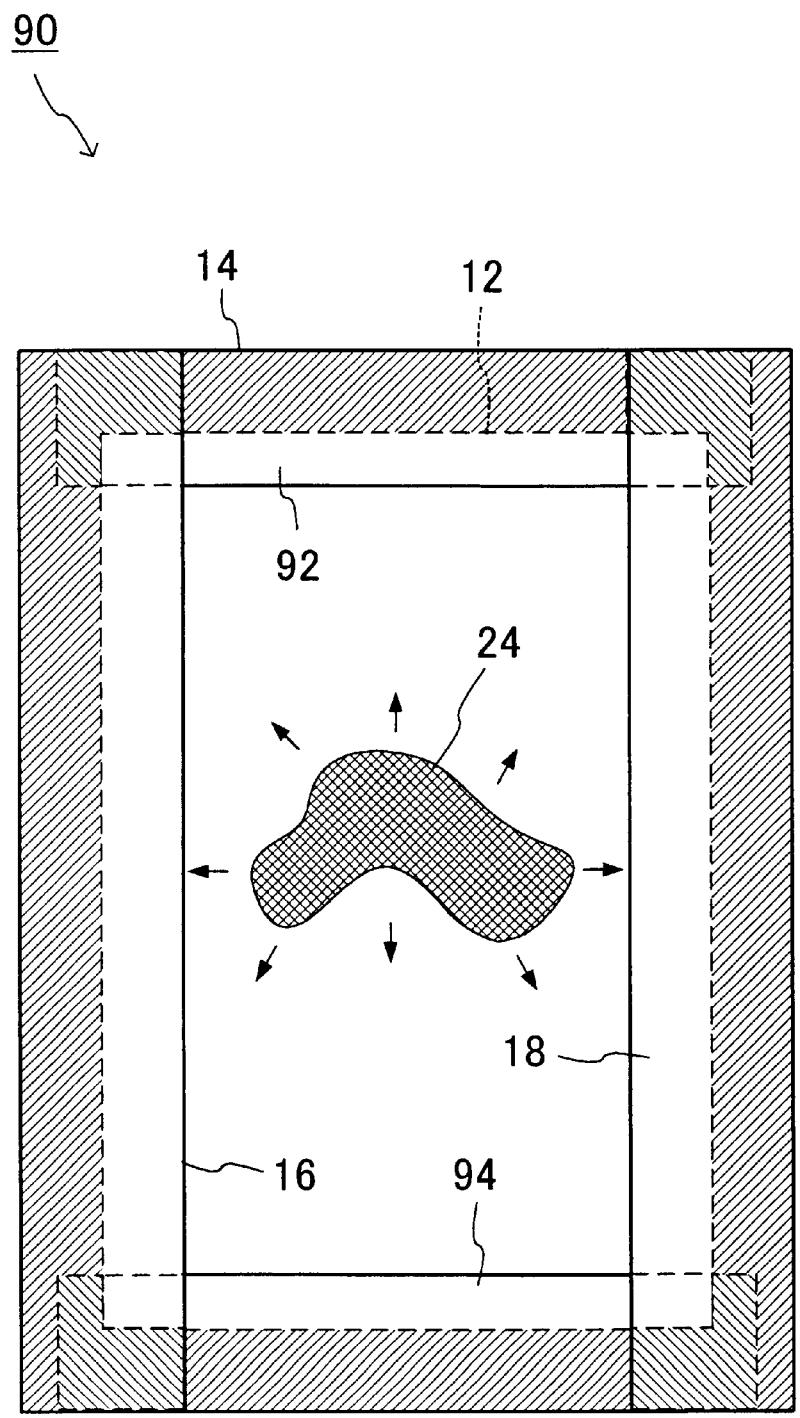
FIG. 15 is a plan view showing a structure of a pet sheet according to an eighth embodiment of the present invention.

FIG. 15 is a plan view showing a pet sheet 90 according to an eighth embodiment of the present invention. In the pet sheet 90 according to this embodiment, flaps 92 and 94 are additionally provided at each of the two short sides of the pet sheet 10 according to the first embodiment. In addition, composing elements identical to or corresponding to those in the above-described embodiments are given the same reference numerals, and a description of previously described elements is omitted.

The pet sheet 90 includes: an absorbing material 12 having a good water-absorption property for liquid such as urine; a hydrophilic top sheet 14 arranged so as to cover the absorbing material 12; an under sheet (not shown) having water repellency or water resistance, which is arranged so as to sandwich the absorbing material 12 between the under sheet 20 and the hydrophilic top sheet 14; and a pair of flaps 16 and 18 arranged at peripheral ends or rims on longer sides of the absorbing material 12 (hydrophilic top sheet 14); and a pair of flaps 92 and 94 provided at peripheral ends or rims of shorter sides of the absorbing material 12 (hydrophilic top sheet 14). The flaps 92 and 94 are adhered to the hydrophilic top sheet 14 in the same manner as the flaps 16 and 18.

In this embodiment, since the flaps 16, 18, 92, and 94 are provided on the entire periphery of the pet sheet 90, leakage of the urine 24 can be prevented regardless of the direction of the flow of the urine 24. In addition, in this embodiment, although the grooves or the indentations are not formed in the absorbing material 12, the grooves and/or indentations (52, 54, 62, 64, and 72), which are adopted in the above-mentioned embodiments, can also be used. For example, the grooves can be formed along the flaps 16, 18, 92, and 94 on the entire periphery of the absorbing material 12.

Having described our invention as related to the embodiments, it is our intention that the invention not be limited to the foregoing embodiments, but many modifications and variations are possible within the spirit and scope of the appended claims. While the invention has been described in its preferred embodiments in the foregoing description, it may be possible that the embodiments are combined in various ways. For example, it is possible that the entire surface of the absorbing material 12 is subjected to an embossing process to form the indentations 72, and grooves are also formed along the longitudinal direction of the flaps at the rims of the absorbing material 12.

According to the present invention, as described above, there is such an advantage that the ratio of leakage of the urine to the outside of the pet sheet can be decreased.

What is claimed is:

1. A pet sheet comprising:
    an absorbent material having a good absorbing property for liquid;
    a hydrophilic top sheet provided on the absorbing material; and
    a flap which is formed at least adjacent a peripheral edge of the absorbing material to have a free end opening toward the center of the absorbing material, said flap having a water repellant side facing being superimposed on the hydrophilic top sheet and said flap the hydrophilic top sheet in an unused state with the free end of the flap raising up to receive and contain liquid there beneath when liquid is placed on the sheet and allowed to flow toward the free end opening of the flap.
2. A pet sheet according to claim 1, wherein
    no extra intermediate material is provided between the hydrophilic top sheet and the flap, and the flap is maintained to be flat to the hydrophilic top sheet.
3. A pet sheet according to claim 1, wherein
    a plurality of the flaps is formed on the hydrophilic top sheet.
4. A pet sheet according to claim 3, wherein
    the flaps are formed on the entire surface of the absorbing material.
5. A pet sheet according to claim 1, wherein
    at least one end of each of the flaps adjacent peripheral edges of the absorbing material, which is opposite the free end thereof, is fixed to the hydrophilic top sheet in two dimensions.
6. A pet sheet according to claim 5, wherein
    the absorbing material and the hydrophilic top sheet are generally rectangular; and
    the flap is provided along at least one side of the absorbing material and the hydrophobic topsheet, and the flap is fixed along an angular C shape.
7. A pet sheet according to claim 1, wherein
    an indentation is formed at least at a position corresponding to the flap adjacent peripheral edges of the absorbing material.
8. A pet sheet according to claim 7, wherein
    the indentation is a groove formed to extend along the flap.
9. A pet sheet according to claim 8, wherein
    the flap is formed so as to cover a part of the groove.
10. A pet sheet according to claim 7, wherein
    a plurality of small areas is formed on the absorbing material by being partitioned by a plurality of the indentations.
11. A pet sheet according to claim 10, wherein
    the small areas are formed on the entire surface of the absorbing material by the indentations.
12. A pet sheet according to claim 1, wherein the flap has a rigidity that allows the flap to be raised up when liquid enters beneath the free end opening thereof.
13. A pet sheet comprising:
    an absorbent material having a good absorbing property for liquid;
    a hydrophilic top sheet arranged on the absorbing material:
    a flap which is formed at least adjacent a peripheral edge of the absorbing material to have a free end opening toward the center of the absorbing material, said flap having a water repellent side facing being superimposed on the hydrophilic top sheet and said flap the hydrophilic top sheet in an unused state with the free end of the flap raising up to receive and contain liquid there beneath when liquid is placed on the sheet and allowed to flow toward the free end opening of the flap; and
    a plurality of grooves formed in the top surface of the absorbing material for guiding the flow of the liquid in a specified direction.
14. A pet sheet according to claim 13, wherein:
    the absorbing material is formed in a rectangular shape; and
    the grooves extend in the longitudinal direction adjacent longer sides of the absorbing material.
15. A pet sheet according to claim 13, wherein the flap has a rigidity that allows the flap to be raised up when liquid enters beneath the free end opening thereof.

* * * * *